United States Patent [19]

Menechella

[11] Patent Number: 5,421,068
[45] Date of Patent: Jun. 6, 1995

[54] FASTENER ASSEMBLY

[75] Inventor: Gino Menechella, Richmond Hill, Canada

[73] Assignee: The Whitaker Corporation, Wilmington, Del.

[21] Appl. No.: 120,260

[22] Filed: Sep. 13, 1993

[51] Int. Cl.$^6$ ............................................... B60M 1/24
[52] U.S. Cl. ....................................... 24/298; 24/459; 191/40
[58] Field of Search ................. 248/61, 62, 74.1, 74.2, 248/68.1, 58; 191/23 A, 40, 41, 43; 24/298, 459

[56] References Cited

U.S. PATENT DOCUMENTS

| 1,728,820 | 9/1929 | Bower . | |
|---|---|---|---|
| 1,886,463 | 11/1932 | Birch . | |
| 2,021,515 | 11/1935 | Matteo | 191/40 X |
| 2,596,022 | 5/1952 | Genter . | |
| 2,923,567 | 4/1960 | Mageoch . | |
| 3,085,775 | 4/1963 | Crates et al. | 191/40 X |
| 3,774,269 | 11/1973 | Campbell . | |
| 3,985,211 | 10/1976 | Bommart . | |
| 3,995,725 | 12/1976 | Howell, Jr. . | |
| 4,163,485 | 8/1979 | Howell, Jr. . | |
| 4,546,218 | 10/1985 | Ruellan . | |
| 4,658,100 | 4/1987 | Suris . | |

FOREIGN PATENT DOCUMENTS

| 682102 | 5/1930 | France | 191/40 |
|---|---|---|---|
| 590712 | 12/1933 | Germany | 191/40 |
| 8438 | 1/1983 | Japan | 191/43 |
| 170831 | 9/1921 | United Kingdom | 191/43 |

OTHER PUBLICATIONS

AMP Drawing No. 81462, "Messenger Hanger Clamp Assembly", Mar., 1990; AMP Special Industries, Valley Forge, Pa.
AMP Drawing No. 81463, "Catenary Clip Assembly", Mar., 1990; AMP Incorporated, Harrisburg, Pa.
Catalog Page, "Railway Catenary Fittings", (date unknown); Richard Bergner GmbH & Co., Schwabach, Germany.
Drawing No. F 2528, "Tragseilklemme"; (date unknown); Richard Bergner GmbH & Co., Schwabach, Germany.
Drawing No. 3E 3786 b, "Hangerklemme"; (date unknown); Richard Bergner GmbH & Co., Schwabach, Germany.

Primary Examiner—James R. Brittain
Attorney, Agent, or Firm—Katherine A. Nelson

[57] ABSTRACT

A fastener assembly 20 having a hook 68 for connecting a first article 78 to a continuous cable 70 includes first and second matable members 22,24, each having a body portion 26 at a cable-proximate end thereof, the body portion 26 having a work arm 32 and a cable-proximate arm extending outwardly from a mating face 28 thereof and defining therebetween a recess 48 for receiving the body portion 26 of the other member when the members are mated, and a hook portion 54. The work and cable-proximate arms 32,40 of the first member 22 are in opposite vertical orientation to the work and cable-proximate arms 32,40 of the second member 24. The members 22, 24 are secured together by engaging a cable engaging surface 42 of the cable-proximate arms 40 of each of the members to opposite sides of a cable 70 and slidingly moving them together until latches 38 on the respective work arms 32 engage corresponding latching recesses 46 of the cable-proximate arms 40 and latching surfaces 66 on the respective hook portions 54 engage each other.

6 Claims, 6 Drawing Sheets

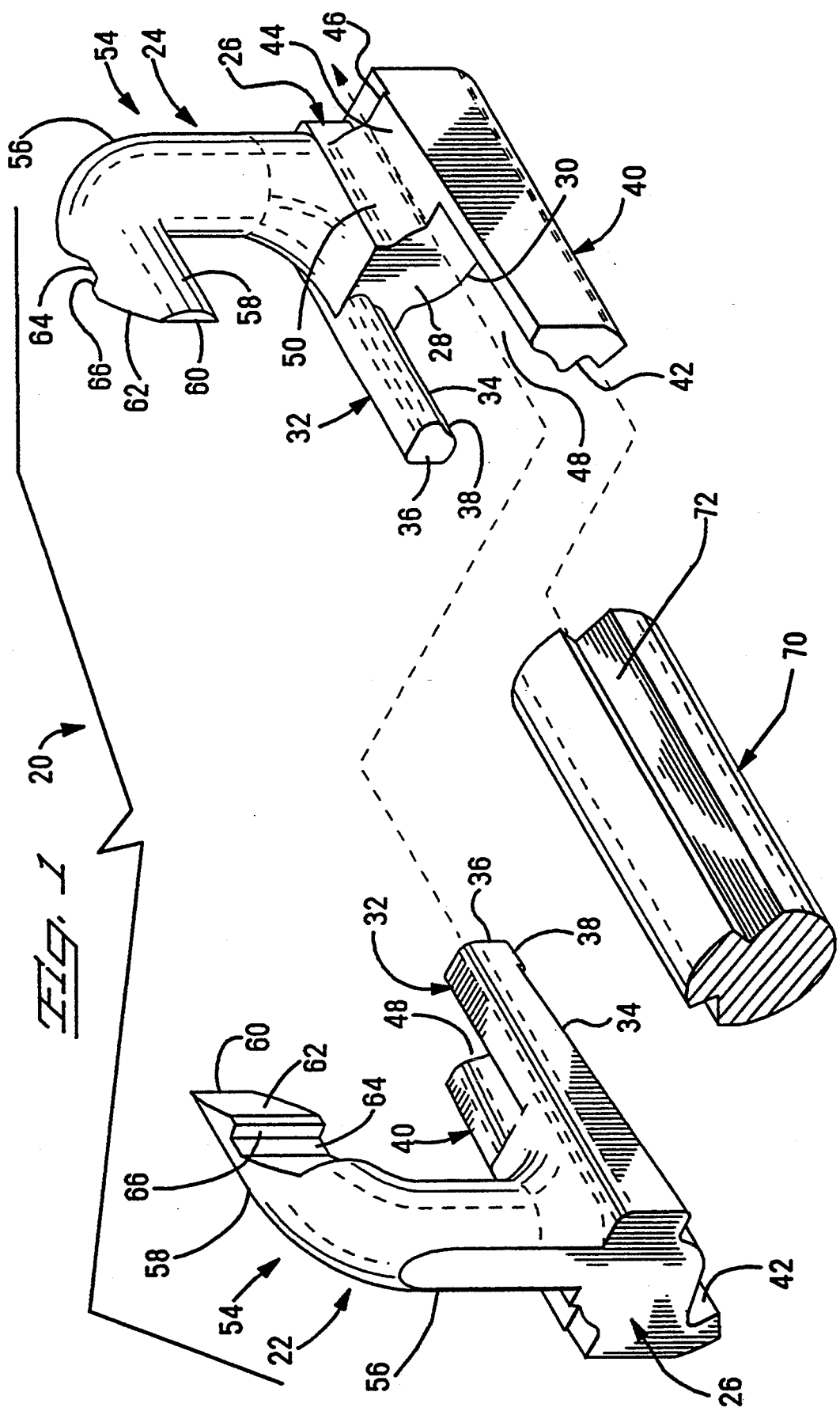

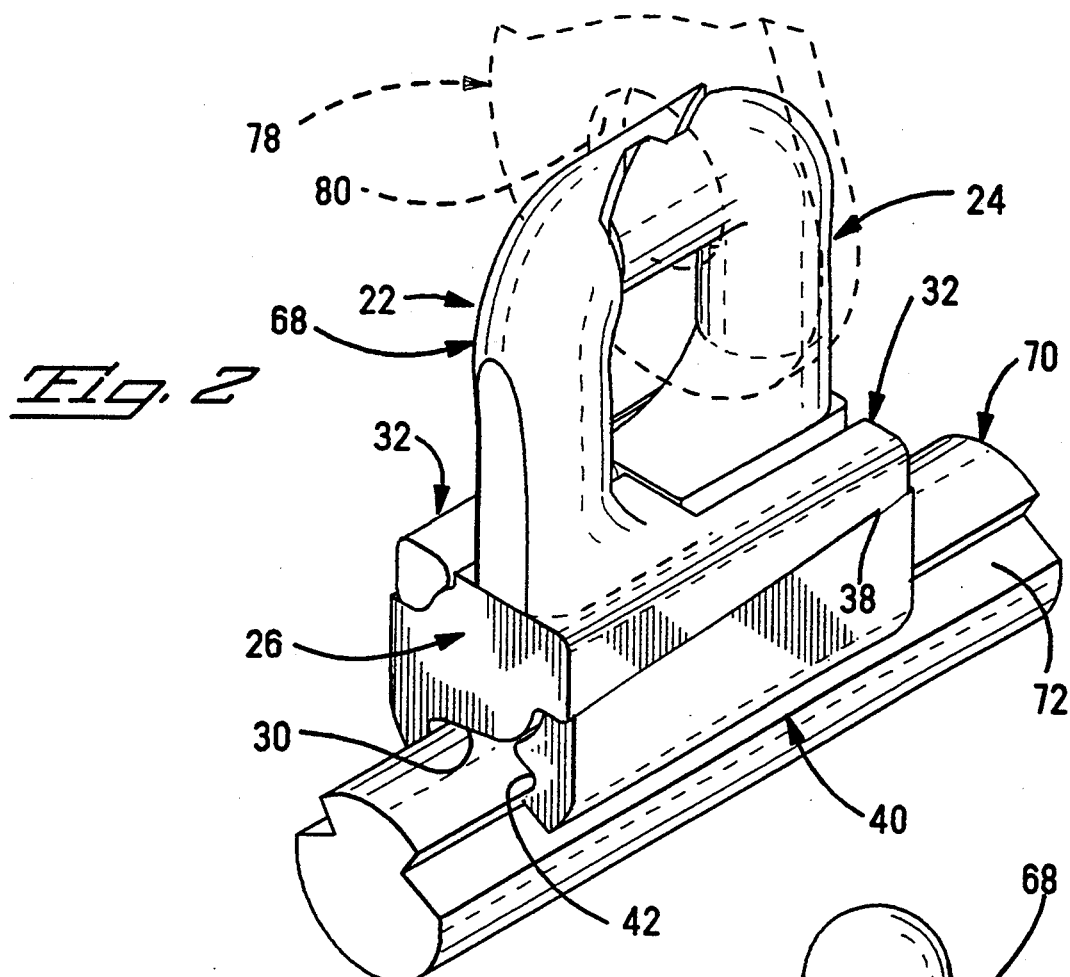
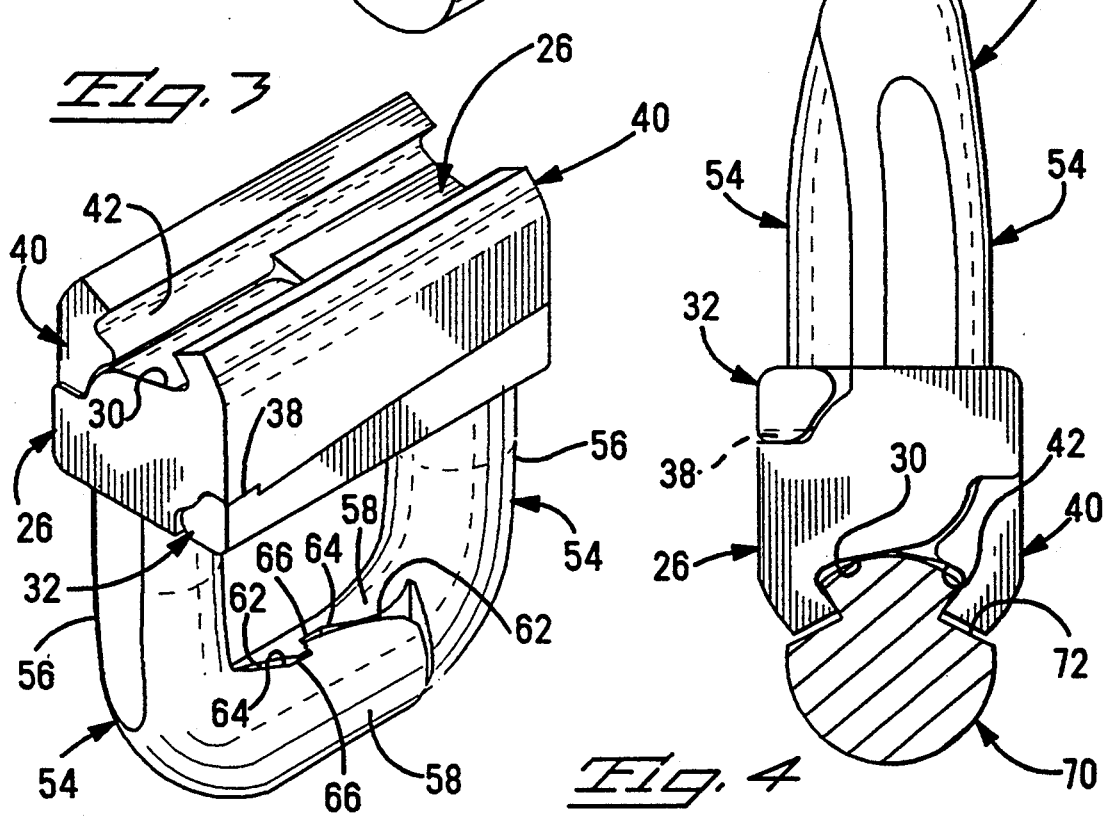

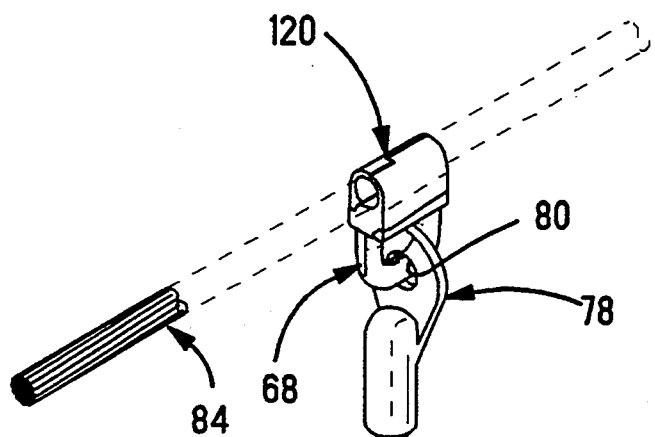
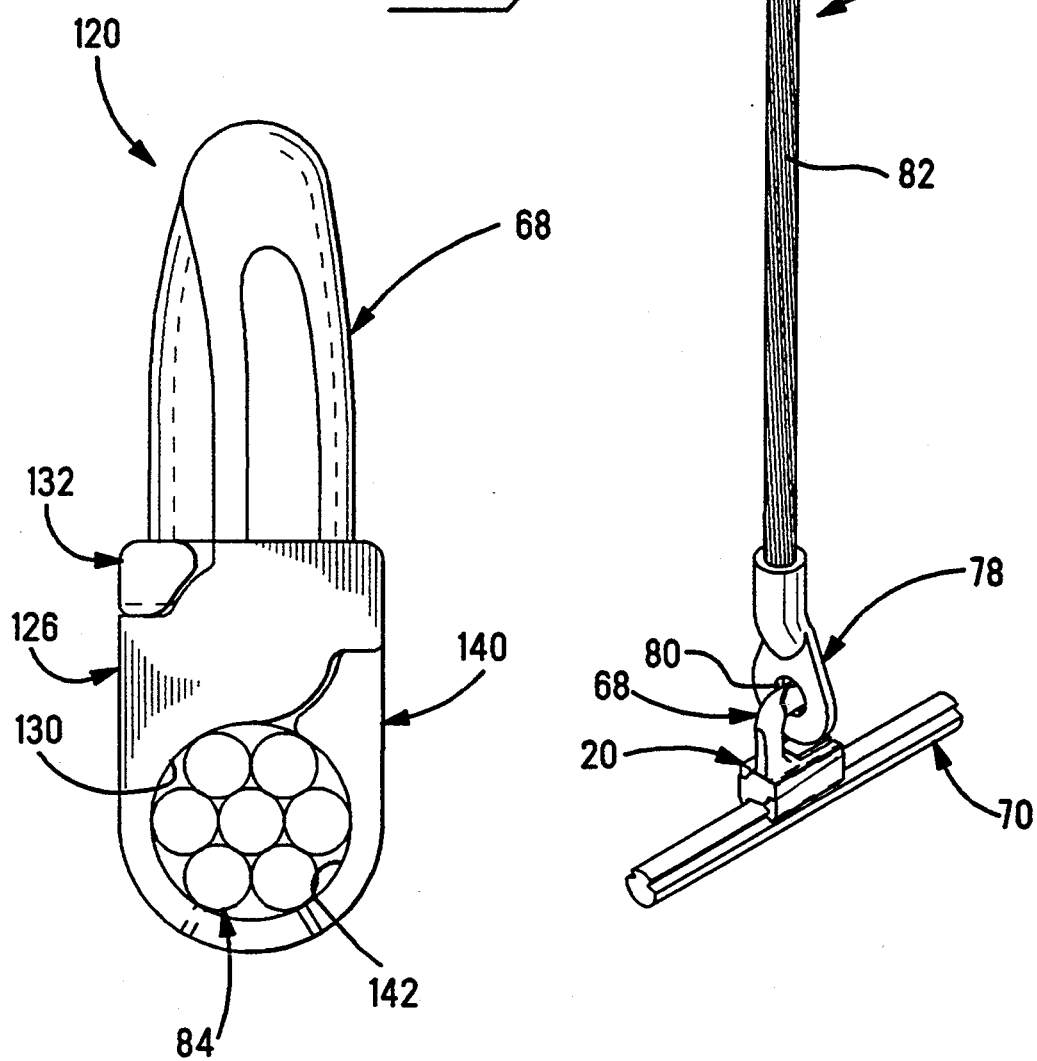

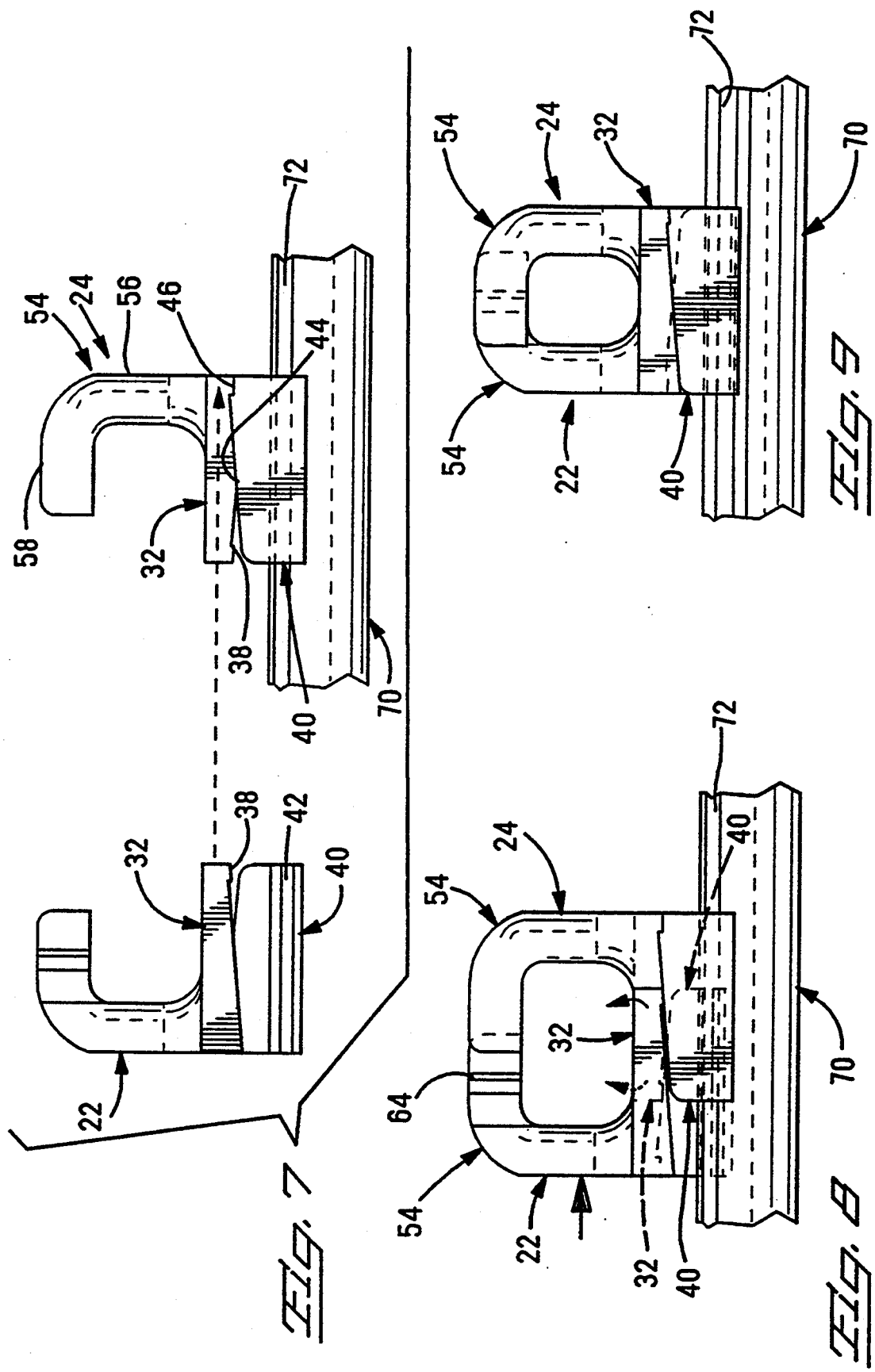

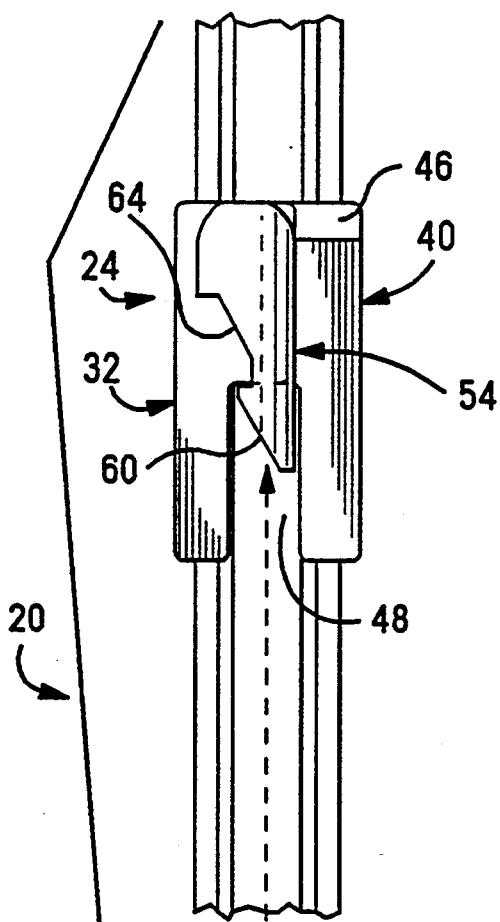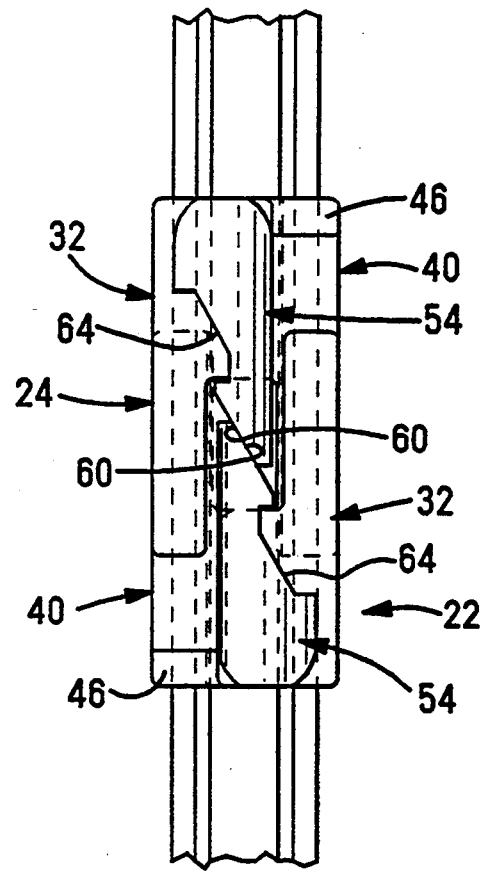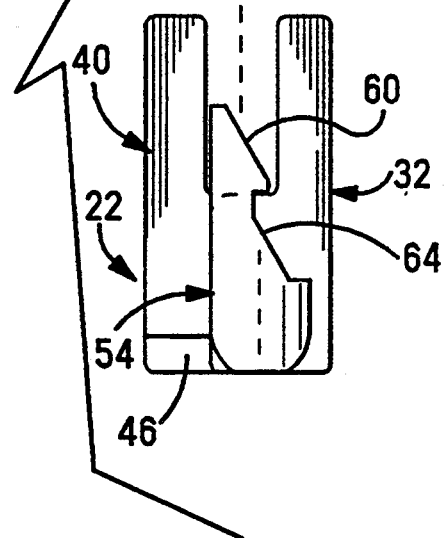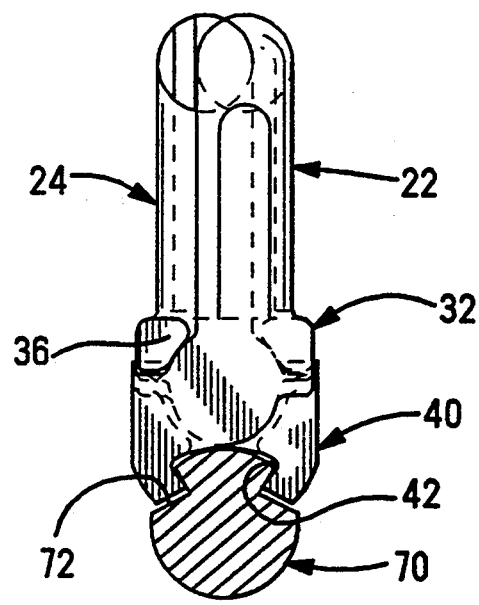

FASTENER ASSEMBLY

FIELD OF THE INVENTION

The present invention relates to fasteners and more particularly to fasteners for securing an article to a cable.

BACKGROUND OF THE INVENTION

With the advent of commercially available electrical power transmission, certain vehicles have been devised utilizing electricity provided by cables strung overhead along fixed routes. Such vehicles include trolley cars and locomotives and incorporate devices such as trolleys or pantographs engageable with an exposed trolley contact wire or conductor suspended from a catenary cable at a substantially constant height above the ground path or rails upon which the vehicles will travel. The surface of the electrified conductor is continuously exposed along its length for such engagement, and fastening the conductor for suspension from the catenary cable must provide clearance for the continuously exposed surface. Such conductors generally are solid wire extrusions of high strength, low resistance copper alloy having a generally cylindrical cross section profiled to define a pair of grooves on opposed sides of the top half of the conductor into which appropriately shaped clamping surfaces of conventional fasteners are received to achieve a griping relationship to the conductor. Such conventional fasteners also include a hook to which eyelets of hanger cables can be attached. Corresponding fasteners can be utilized to secure the hanger cables to the catenary cable overhead but which can be clamped entirely around the catenary cable. As the catenary cable assumes a catenary curved vertical shape upon being suspended between spaced supports, the hanger cables are of different lengths appropriate to maintain the conductor cable at a constant height when hung from the varying height of the vertically curved catenary cable.

One such conventional fastener comprises a pair of halves secured together above the cable conductor by a bolt and nut arrangement. A similar type fastener is used to secure the hanger cable to the catenary cable. The bolt and nut arrangements, however, gradually become loosened owing to the environmental exposure, dimensional changes owing to thermal expansion and other factors including the vibration transmitted to the line by the vehicles using the cable. Maintenance of the line requires that each bolt and nut arrangement be checked on a periodic basis to assure that the fastening device is securely fastened to the cable. Such fasteners furthermore require that the maintenance persons have an inventory containing a number of different parts such as for example nuts, bolts, lock-washers, in addition to the members forming the fastening devices themselves. It is desirable, therefore, to have a fastening device eliminates the use of bolt and nut arrangements. It is also desirable to have a fastening device that minimizes the number of parts.

SUMMARY OF THE INVENTION

The present invention is directed to a fastener assembly that overcomes the disadvantages of the prior art. The fastener assembly includes first and second matable members, each member including a body portion at a cable-proximate end thereof and a hook portion. The body portion includes a cable clamping surface defining an axis parallel with a cable upon assembly thereto, a work arm and a cable-proximate arm. The two arms extending outwardly in a first direction from the mating face of the body portion and substantially along opposite sides of the axis. The hook portion has first and second sections, the first section extending from the body portion in a direction away from the axis and essentially perpendicular to the first direction and a second section extending from the first section and essentially parallel to the axis. The work and cable-proximate arms of the first matable member are in opposite vertical orientation to the work and cable-proximate arms of the second matable member. The work and cable-proximate arms of one member define a recess therebetween for receiving the body portion of the other matable member when the first and second members are mated.

Each of the work arms are tapered along the lower surface thereof and have a latch at the leading ends. Each cable-proximate arm includes a cable engaging surface along an inner side thereof coextensive with the cable clamping surface of the body portion. Each cable-proximate arm further includes a tapered surface along the top edge complimentary to the tapered lower surface of the work arm of the other matable member. The tapered surface further includes a latching recess adapted to latchingly cooperatively receive the latch of the work arm of the other member when the members are mated.

Each second hook portion of the two matable members includes a camming surface extending from a free end thereof rearwardly to a latching means. The camming surface is adapted to engage against the camming surface of the other member when the two members are mated thereby deflecting apart the hook portions until the latching means engage to secure the mated members in the mated condition.

Upon engaging the cable engaging surface of the cable-proximate arms of each of the members onto opposite sides of the cable and slidingly moving the work and cable-proximate arms together, each work arm of one member moves along the upper tapered surface of the respective cable-proximate arm of the other member causing the cable-proximate arms to rotate against the cable thereby increasing the engaging force on the cable until the respective arm and hook latches become latched thereby securing the work and cable-proximate arms in the mated condition. The fastener is clamped to the cable by the clamping surfaces of the members and a continuous ring is defined by the hook portions to which an article is or can be secured.

In the preferred embodiment, the matable members are hermaphroditic. In one preferred embodiment of the invention, the cable clamping surface of the body and the cable-proximate arm are dimensioned and configured to clamp around and be secured within grooves extending along the top half of the cable. In a second preferred embodiment the cable clamping surfaces are dimensioned and configured to clamp around and surround the cable. The body and arms are configured to maintain contact pressure on the conductor as well as to compensate for dimensional variations. As the sliding elements are moved past each other, the components are forced to rotate and clamp unto the cable. The clamping portions also deflect as the forces increased during the mating of the two members. This deflection acts as a spring giving the fastener a system of stored energy to compensate for dimensional changes owing to thermal expansion and the like.

It is an object of the invention to provide a fastener assembly to suspend an electrical cable from a hanger cable or a hanger cable from a support cable without the use of nut and bolt arrangements and thereby reducing overall assembly complexity and weight.

It is another object of the invention to provide a fastener assembly that can be clamped together quickly without the need for special tools.

It is a further object of the present invention to provide a hermaphroditic fastener assembly thereby minimizing manufacturing inventory.

Embodiments of the present invention will now be described by way of example with reference to the following drawings.

BRIEF DESCRIPTION OF THE DRAWINGS

FIG. 1 is an isometric view of the fastener assembly of the present invention with the matable members exploded from one another and from a cable.

FIG. 2 is an isometric view of the mated members of fastener assembly of FIG. 1 mounted to a cable with the hook portion engaging a ring of another article as shown in phantom.

FIG. 3 is a bottom view of the mated assembly of FIG. 2 with the cable removed.

FIG. 4 is an end view of the assembly of FIG. 2 mounted to a cable.

FIG. 5 is an end view of an alternative embodiment the invention.

FIG. 6 is a view illustrating the clamping fastener devices of the present invention wherein one assembly is attached to the conductor cable and the other embodiment is mounted to a catenary cable, each of the hook portions of the respective assemblies being attached to eyelet assemblies of a hanger cable.

FIG. 7 through 16 illustrates the steps in mating the two members of the present invention.

FIG. 7 is a side view of the first and second members prior mating with one of the members mounted to the cable.

FIG. 8 shows the partially mated fastener assembly.

FIG. 9 is a side view of the mated fastener assembly.

FIG. 10 is a top plan view prior to mating of the first second members with one member mounted to the cable as show in FIG. 7.

FIG. 11 is a top plan view of the partially mated first and second-members as shown in FIG. 8.

FIG. 12 is an end view of the partially assembled fastening device of FIG. 11.

FIG. 13 is a top plan view of the two members shortly before they are fully mated.

FIG. 14 is an end view of the partially mated fastener assembly of FIG. 13.

FIG. 15 is a top plan view of the fully mated fastener assembly as shown in FIG. 9.

FIG. 16 is an end view of the mated assembly of FIG. 15.

DETAILED DESCRIPTION OF THE DRAWINGS

Figure 13:
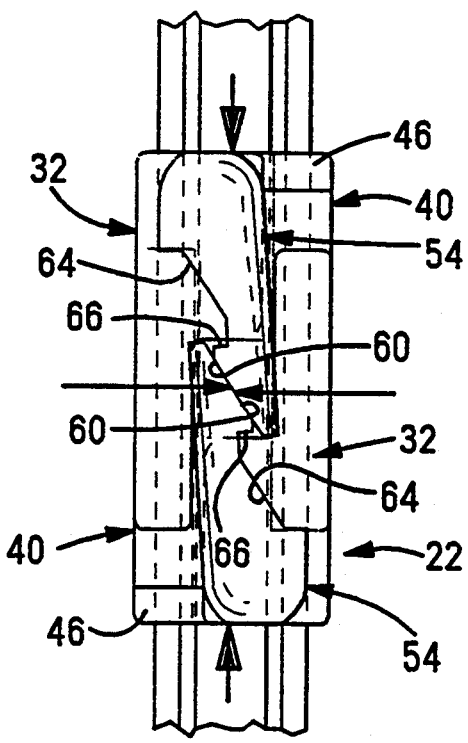

Referring now to FIGS. 1 through 4 the fastener assembly 20 of the present invention includes a hook 68 for connecting an article to a continuous cable 70 at a selected located therealong. FIG. 6 illustrates one use of the present invention wherein the fastener assembly 20 is secured to a conductor cable 70 with hook 68 engaging eyelet 78 at one end of a hanger cable 76 and the eyelet 78 at the other end of the hanger cable is attached to hook 68 of an alternative embodiment 120 of the present invention which is in turn secured to the catenary cable 84.

In the most preferred embodiment these members are hermaphroditic. The same numbers, therefore, will be used to identify the corresponding parts on the two members 22,24. It is to be understood, however, that the invention is not limited to hermaphroditic members.

Each member, 22,24 includes a body portion 26 having a mating face 28 and a cable clamping body surface 30 defining an axis parallel with a cable upon assembly of the member thereto. The body portion 26 further has a work arm 32 and a cable-proximate arm 40 extending outwardly in a first direction from the mating face 28 of body portion 26. The work and cable-proximate arms extend from the body portion 26 substantially along opposite sides of the axis.

For each member 22,24 the work arm 32 is associated with a first side of the cable 70 and is spaced from the cable 70. The cable-proximate arm 40 is associated with a second side of the cable and engageable with the surface of the cable 70. The work and cable-proximate arms 32,40 of the first matable member 22 are in opposite vertical orientation to the work and cable-proximate arms 32,40 of the second matable member 24. The work and cable proximate arms 32,40 of each matable member define a mating recess 48 therebetween for receiving the body portion 26 of the other matable member when the first and second members 22,24 are mated. Each work arm 32 is tapered along its lower surface 34. The leading end 36 of work arm 32 further includes a latch 38 on the lower surface 34. Each cable proximate arm 40 includes a cable engaging surface 42 along an inner side thereof which is coextensive with the cable clamping surface 30 of the body portion 26. The cable clamping surface of the body member 26 and the cable-proximate arm 40 are associated with the same side of the cable 70. Each cable-proximate arm 40 further includes a tapered surface 44 along its upper edge complementary to the tapered lower surface of the work arm 32 of the other matable member. The tapered surface 44 further includes a latching recess 46 adapted to latchingly and cooperatively receive the latch 38 of the work arm 32 of the other member. Body 26 further includes a work arm receiving recess 50 above and adjacent to the tapered surface 44 of the cable-proximate arm 40, defining a bearing surface.

Body portion 26 further includes a hook portion 54 having first and second sections 56,58 respectively. The first hook section 56 extends from the body portion 26 in a second direction away from the axis and essentially perpendicular to the axis. The second section 58 extends from the first section 56 and in a direction parallel to the axis. The second hook portion 58 extends to a free end 60 and include a camming surface 62 extending rearwardly therefrom to a latching surface 64 including a latching edge 66. The camming surfaces 60 are adapted to engage and bear against the camming surface 60 of the other member when the first and second members 22,24 are mated. The camming surfaces 60 deflect apart the two hook portions 58 until the latching means 64,66 engage and thereafter secure the mated members 22,24 in the mated condition. FIG. 2 further illustrates the insertion of the hook member through an eyelet 80 of ring members 78 as shown in phantom and as better seen in FIG. 6. For purposes of illustrating the invention, the hanger cable and ring have been eliminated from the other figures.

As can be seen in FIGS. 1, 2 and 4, cable 70 has a generally cylindrical cross section profiled to define a pair of grooves 72 on opposed sides of the top half of the cable 70 into which the appropriately configured cable engaging surface 42 of cable-proximate arms 40 are received when members 22 and 24 are mated to each other. The matable members 22,24 of the present invention are assembled to the cable by mounting the cable engaging surface 42 of the cable-proximate arm of each of the first and second members 22,24 to opposite sides of the cable 70 and slidingly moving the first and second members 22,24 together such that tapered lower surface 34 of each of the corresponding work arms 32 of the members 22,24 moves along the upper tapered surface 44 of the respective cable-proximate arm 40 of the other member causing the work arm to bear against body surface 50 and further cause the cable-proximate arms 40 to rotate against the cable 70 thereby increasing the engaging force on the cable 70 until the respective arm latches 38 latch into recess 46 and hook latches 66 become latched together thereby securing the first and second members 22,24 in the mated condition.

FIGS. 4 and 5 are end views of the two fastener assembly embodiments 20 and 120 respectively, which are shown in the catenary system illustrated in FIG. 6. As can be seen from FIGS. 4 and 6, cable engaging surface 24 of assembly 20 clamps to a current carrying cable 70 in grooves 72 that extend along the top half of the cable. The lower portion of cable 70 is continuously exposed for interconnection to a trolly wheel, pantograph or the like to convey electrical energy to a vehicle, such as a trolley car or locomotive. In embodiment 120, body member 126 includes work arm 132 and cable-proximate arm 140 having cable engaging surface 142, which extends completely around cable 84, as best seen in FIG. 6.

The first and second members of the present invention are preferably made from a copper alloy such as a silicon brass or other suitable corrosion resistant materials, as known in the art.

FIGS. 7 through 16 illustrate the steps in mating the two members 22,24 and further illustrate the forces generated at the various locations during the mating sequence. The forces are shown being generated as the members are mounted to the conductor cable 70. It will be appreciated that the same types of forces are also generated with the alternative embodiment 120 as it is mounted to the catenary cable 84.

Figure 14:
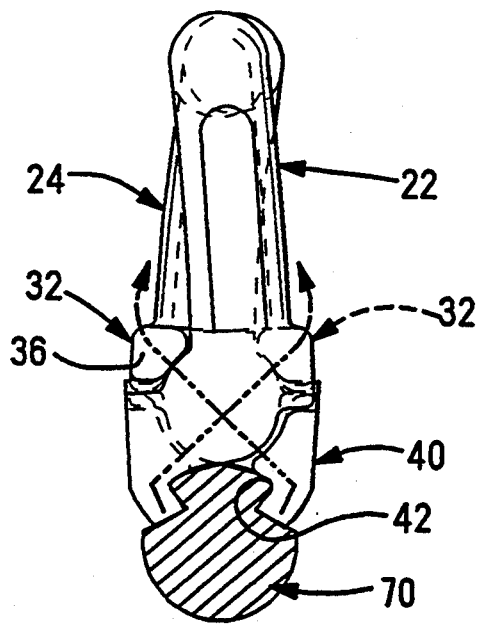

The members 22,24 each have tapered sliding elements to maintain contact pressure on the cable as well as to compensate for dimensional variations of the cable. FIGS. 7 and 10 show the side and top views respectively of one of the members 24 mounted to the cable 70 along one side thereof and the other member 22 being slidingly moved into engagement with the cable 70 and the other member 24. FIGS. 8, 11 and 12 show the two members 22,24 as they are brought into engagement with the work arm 32 of each member being moved along the tapered surface 44 of the cable-proximate arm 40 of the other member. As the sliding members are moved past each other, the members 22,24 are forced to rotate and clamp onto the cable 70, as illustrated in FIG. 12 and 14. As the members are pushed into each other the clamping force increases until the tapered sections snap into the respective recessed areas and lock. The clamping sections of the members deflect as the force is increased, which acts as a spring giving the assembly a system of stored energy.

Figure 15:
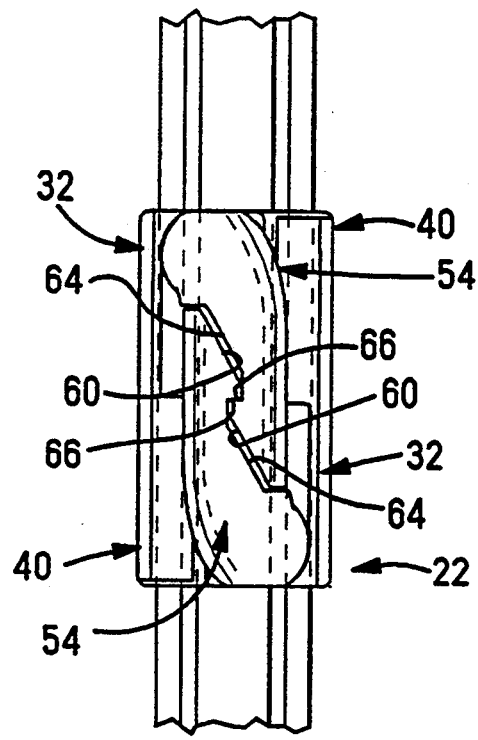
Figure 16:
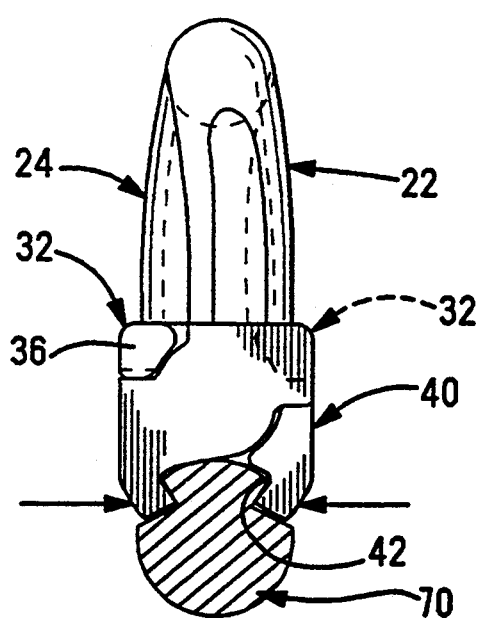

FIGS. 13 and 15 illustrate the forces being generated in the hook portions as the members 22,24 are being mated to each other. As the portions are moved together, camming surfaces 60 deflect the hook 54 of the opposite member in an outwardly direction as the parts are brought together. This generates further force as shown in FIG. 14. FIGS. 9, 15 and 16 illustrate the assembly fully mated on cable 70. The stored energy in the mated assembly enables the assembly to accommodate and compensate for dimensional changes in the cable and the assembly owing to thermal expansion or other factors.

The fastener assembly of the present invention provides a device that is formed of two interlocking members that do not need bolts and nuts assemblies. In its preferred embodiment, the part is hermaphroditic, therefore, reducing the number of parts required for manufacturing as well as parts required for maintenance and repair of electrical power transmission systems used with trolley cars and locomotives and the like. In the embodiment as shown in FIG. 6, only two different fastening components are required, one for the conductor cable and one for the catenary cable. The device can be applied with the use of parallel groove pliers or other similar tools. The present invention allows for ease of maintenance, since there are no bolts and nuts to become loosened, inspection of a hanger wire would reveal if the clamp is secured to the respective cable.

It is thought that the fastener assembly of the present invention and many of the foregoing advantages will be understood from the foregoing description. It is apparent that various changes may be made in the form, construction, and arrangement of parts thereof without departing from the spirit or scope of the invention, or sacrificing all of its material advantages.

I claim:

1. A fastener assembly having a hook for connecting a first article to a continuous cable at a selected location therealong, said fastener assembly comprising:

first and second matable members, each said member including a body portion at a cable-proximate end thereof and having a cable-clamping surface defining an axis parallel with a cable upon assembly thereto, said body portion having a work arm and a cable-proximate arm extending outwardly in a first direction from a mating face of said body portion substantially along opposite sides of said axis, and a hook portion having first and second sections, said first section extending from said body portion in a second direction away from said axis and essentially perpendicular to said first direction and said second section extending from said first section and in said first direction parallel to said axis;

said work and cable-proximate arms of said first member being in opposite vertical orientation to said work and cable-proximate arms of said second member, said work and cable-proximate arms defining therebetween a recess for receiving thereinto said body portion of the other said matable member when said first and second members are mated;

each said work arm being tapered along the lower surface thereof and having a latch at the leading end thereof;

each said cable-proximate arm including a cable clamping surface along an inner side thereof coextensive with said cable clamping surface of said body portion, each said cable-proximate arm further including a tapered surface along the top edge thereof complementary to said tapered work arm of the other said matable member and including a latching recess adapted to latchingly cooperatively receive said latch of said work arm of said other member; and each said second hook section includes a camming surface extending to a free end and extending rearwardly to a latching means, said camming surface adapted to engage and bear against the camming surface of the other member when said first and second members are mated thereby deflecting apart said hook portions until said latching means engage which thereafter secure said mated members in said mated condition, whereby, upon engaging the cable engaging surface of said cable-proximate arms of each of said first and second members to opposite sides of said cable and slidingly moving said first and second members together, each said work arm of one said member moves along the upper tapered surface of the respective cable-proximate arm of the other said member causing the cable-proximate arms to rotate against the cable thereby increasing the engaging force on the cable until the respective arm and hook latches become latched securing said first and second members in the mated condition, thereby defining a clamp fastened to the cable by the clamping surfaces of the members and a continuous ring by the hook portions of the members to which the article is or can be secured.

2. The fastener assembly of claim 1 wherein said first and second members are hermaphroditic.

3. The fastener assembly of claim 1 wherein said cable has a generally cylindrical cross-section profiled to define a pair of grooves on opposing sides of the top half of the cable and said cable clamping surface of said cable-proximate arm is configured to be received in said grooves to achieve a gripping relationship to the cable.

4. The fastener assembly of claim 3 wherein said first and second members are hermaphroditic.

5. The fastener assembly of claim 1 wherein said cable has a generally cylindrical cross-section and said cable clamping surface of said cable-proximate arm is configured to be clamped entirely around said cable.

6. The fastener assembly of claim 5 wherein said first and second members are hermaphroditic.

* * * * *